July 15, 1952 — E. N. MEAKIN — 2,603,170
EXTRUSION MILL
Filed Nov. 14, 1945
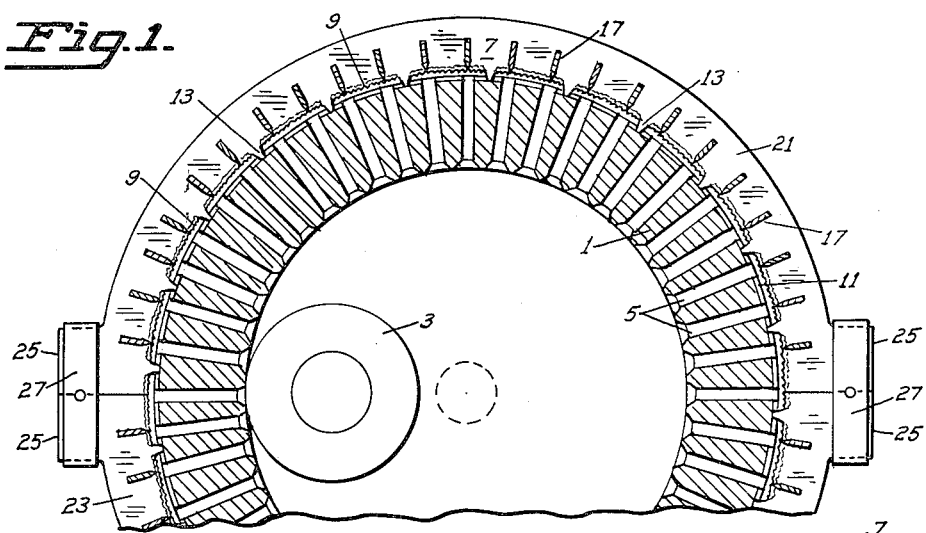
Fig. 1.
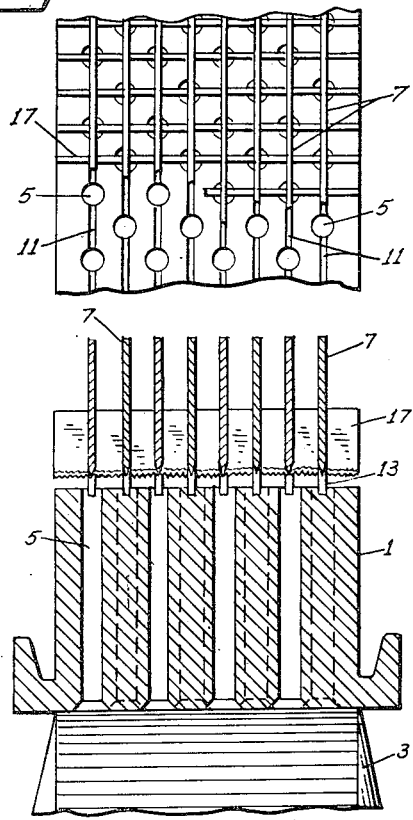
Fig. 2.
Fig. 3.
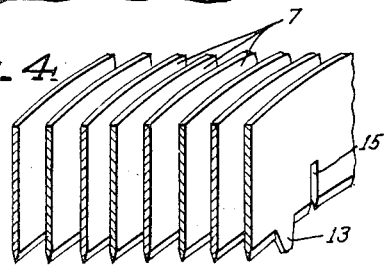
Fig. 4.
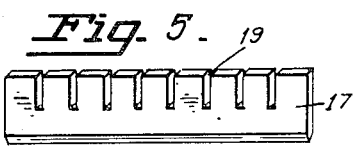
Fig. 5.
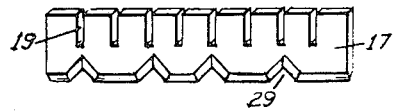
Fig. 6.
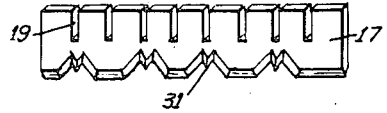
Fig. 7.
INVENTOR
EDGAR N. MEAKIN
BY Charles O. Bruce
ATTORNEY Patented July 15, 1952

2,603,170

UNITED STATES PATENT OFFICE 2,603,170

EXTRUSION MILL

Edgar N. Meakin, San Francisco, Calif.

Application November 14, 1945, Serial No. 628,386

2 Claims. (Cl. 107—8)

My invention relates to the preparation of a compacted food, mineral or other product from ground or comminuted ingredients, and more particularly to a method and apparatus for producing such a product in small units of a size suitable for example, in the preparation of food for baby chicks or the like.

According to prior art practices, commercial foods for the feeding of baby chicks have been prepared in the form of very small-sized pellets. To produce such pellets required a pellet mill wherein ground and suitably prepared material is extruded through the holes of a die from which the pellets are severed to the required length. The cost of producing pellets in the small sizes necessary for this purpose is high, in that pellet mills function less efficiently in extruding material through the small die openings required to produce such pellets.

Among the objects of my invention are:

(1) To provide a novel and improved method and apparatus for the preparation of a compacted product in small units;

(2) To provide a novel and improved method and apparatus for economically producing a compacted product in small units;

(3) To provide a novel and improved method and apparatus for producing a compacted product in small units with a minimum of waste.

Additional objects of my invention will be brought out in the following description of a preferred embodiment of the same, taken in conjunction with the accompanying drawings, wherein:

Figure 1 is a sectional view in a horizontal plane through a pellet mill employing a ring type die and embodying my invention;

Figure 2 is a fragmentary view in elevation, looking toward the discharge side of the die of Figure 1;

Figure 3 is a view in section, taken in a radial plane through the die of Figure 1;

Figure 4 is a three-dimensional view depicting peripheral splitting knives slightly modified with respect to corresponding elements illustrated in Figure 1;

Figures 5, 6 and 7 are three-dimensional views depicting cross-knives adapted for cooperation with circular knives of Figures 1 and 4.

In general, my invention contemplates the compaction of material in units of small size by extruding such material through comparatively large die holes, which can be carried out at relatively high efficiency, and then splitting the extruded strings of material into fragments of the desired small size in a manner which will produce a substantially uniform product with a minimum of waste.

More specifically and with reference to the drawings, I utilize a conventional type pellet mill, preferably one employing a ring type die 1, against the inner or compression side of which is run one or more compression rollers 3. Such die is provided with holes 5, which for the purposes of this embodiment, are radially disposed and of a diameter considerably greater than holes which would normally be employed in pelleting a product such as feed for baby chicks. Surrounding the die are a plurality of circular knives 7, equal in number to the number of circular rows of holes about the surface of the die. These knives are disposed in fixed relationship to the die, with the knife edge 9 of each splitting a circular row of holes around the die.

These circular knives are supported in spaced relationship to the discharge surface of the die, so as to be engaged by the extruded material, following emergence thereof from the die. To assure such spacing, and maintenance of the circular knives in proper alignment with the circular rows of holes around the die, the die is provided with a plurality of peripheral grooves 11, each groove diametrically splitting the holes of one of the circular rows, while each of the circular knives is associated with one of the grooves by having a plurality of spaced inwardly directed radial tabs 13 adapted to snugly fit within such groove at locations between holes.

The circular knives are each formed with a plurality of notches 15 at spaced points along the inner edge thereof and in axial alignment with the holes under such knife. In these notches, the circular knives are adapted to receive a plurality of cross-knives 17, each of which is formed with a plurality of notches 19 across the back edge thereof, corresponding to the number of circular knives and spaced in accordance with the lateral disposition or spacing of the circular knives.

Each hole through the die is accordingly faced by a pair of knife edges intersecting on the axis of such hole, whereby the material as it is extruded from the die, will engage the intersecting edges and be caused to split four ways, with the material ultimately breaking off into segments of a length depending upon the thickness of the knives and the spacing of the cutting edges thereof from the discharge surface of the die.

For economy of manufacture and assembly, each of the circular knives 7 is formed of two or more arcuate sections 21 and 23, each terminating in a laterally extending tab or lug 25 at each end, thus enabling the sections to be assembled end to end about the die by bands 27 encircling the adjacent tabs. The cross-knives are, of course, first assembled to the semi-circular sections and serve with the circular knives to form a very rugged assembly.

As indicated in Figure 1, the knife edge may be of serrated or saw-toothed shape, the size of the teeth being small in comparison with the diameter of the die holes.

As depicted in Figures 4 and 5, the knife edges may be continuous across the die holes, in lieu of being serrated, and where the holes in one circular row are staggered with respect to those of adjacent rows, as illustrated in Figure 2, the cross-knives, as well as the circular knives, if desired, may have notches 29 formed in the edges thereof intermediate the die holes.

The number of circular rows of die holes formed in the die is preferably an even number, whereby all cross-knives may be standardized as to construction, it being noted in this connection that alternate cross-knives may be similar to but merely reversed in position with respect to adjacent cross-knives.

In lieu of relying upon a knife edge to split the extruded strings of material, a sharp point directed at the center of such extruded material will serve a similar purpose, and with this in mind, I contemplate providing sharp points 31 on the knives as an alternative means, at points coinciding with the axes of the die holes. Such points need appear only on the one set of knives. When such points are embodied in the notches of a knife as illustrated in Figure 7, such knife can be utilized either for its cutting edge or for its points, depending on how it is assembled to the circular knives.

In operation, as previously indicated, the material as it is extruded is split by the knives and fractured into substantially uniform fragments, the average size of which will depend largely upon thickness of knives and spacing thereof from the die surface. The fact that the splitting occurs as the material is extruded is of significance, in that the material at that stage is at elevated temperature, which may be due partly to pre-cooking of the mixture, and partly due to heat of compression, and contains substantial moisture, thereby permitting it to fracture to a somewhat uniform size and with little dust or waste.

Another factor contributing toward this result is the fixed relationship existing between the die and the splitting knives. This relationship is maintained whether the die is stationary or movable relative to the extrusion roller, since the die constitutes the support for the knives.

From the above description of my invention in its preferred form, it becomes apparent that my improved method is not tied down to the specific apparatus disclosed. The cross-knives, for one thing, may be discarded if splitting the extruded strings of material in half will produce fragments of the average size desired. Different types of extruding apparatus may be utilized inasmuch as a flat die and similarly associated splitting knives will produce the results contemplated.

Accordingly, while I have disclosed my invention in its preferred form, I do not desire to be limited in my protection to the details as described and illustrated, except as may be necessitated by the following claims.

I claim:

1. In combination, a circular extrusion die having a plurality of circular rows of holes through which material is extruded, and a plurality of circular knives surrounding said die in spaced relationship to the discharge surface thereof, with each knife disposed with its edge in line with and facing a circular row of holes.

2. In combination, a circular extrusion die having a plurality of circular rows of holes through which material is extruded, a plurality of circular knives surrounding said die in spaced relationship to the discharge surface thereof, with each knife having its edge in line with and facing a circular row of holes, and a plurality of cross-knives intersecting said circular knives on the axes of said holes.

EDGAR N. MEAKIN.

REFERENCES CITED

The following references are of record in the file of this patent:

UNITED STATES PATENTS

| Number | Name | Date |
| --- | --- | --- |
| 788,843 | Noack et al. | May 2, 1905 |
| 1,303,131 | Tripolitis | May 6, 1919 |
| 1,432,919 | Stewart | Oct. 24, 1922 |
| 1,846,423 | Harrington | Feb. 23, 1932 |
| 1,915,528 | Haug | June 27, 1933 |
| 1,949,835 | James et al. | Mar. 6, 1934 |
| 2,015,857 | Leo | Oct. 1, 1935 |
| 2,174,141 | Sizer | Sept. 26, 1939 |
| 2,252,900 | Shafer | Aug. 19, 1941 |